United States Patent
Hetzel et al.

(10) Patent No.: US 7,572,850 B2
(45) Date of Patent: Aug. 11, 2009

(54) RUBBER COMPOSITION AND TIRE COMPRISING SAME

(75) Inventors: Peter Hetzel, Greenville, SC (US); Jean-Michel Douarre, Aubiere (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/639,942

(22) Filed: Dec. 15, 2006

(65) Prior Publication Data

US 2007/0100042 A1    May 3, 2007

Related U.S. Application Data

(63) Continuation of application No. PCT/US2004/020961, filed on Jun. 29, 2004.

(51) Int. Cl.
  *A01N 33/06* (2006.01)
  *B29B 9/00* (2006.01)
(52) U.S. Cl. .......................................... 524/254; 425/17
(58) Field of Classification Search .................. 524/254; 425/17
  See application file for complete search history.

(56) References Cited

U.S. PATENT DOCUMENTS

| | | |
|---|---|---|
| 3,391,107 A | 7/1968 | Stahly |
| 3,592,793 A | 7/1971 | Latos |
| 3,634,318 A | 1/1972 | Shoffner |
| 3,968,080 A | 7/1976 | Merten et al. |
| 4,764,547 A | 8/1988 | Hatanaka et al. |
| 4,767,809 A * | 8/1988 | Wingrove .................... 524/255 |
| 5,229,459 A * | 7/1993 | Sandstrom et al. .......... 525/136 |
| 7,105,595 B2 * | 9/2006 | Mabry et al. ................. 524/495 |
| 2002/0046798 A1 * | 4/2002 | Hahn ....................... 156/130.7 |
| 2002/0165302 A1 | 11/2002 | Lamba et al. |

FOREIGN PATENT DOCUMENTS

WO    2005/108480 A    11/2005

OTHER PUBLICATIONS

International Search Report, PCT/US2004/20961, dated Dec. 8, 2004.
Supplementary Partial European Search Report, EP 04 77 7290 (PCT/US2004/20961), dated Feb. 6, 2008.

* cited by examiner

*Primary Examiner*—Peter D Mulcahy
(74) *Attorney, Agent, or Firm*—Frank J. Campigotto; E. Martin Remick

(57) ABSTRACT

A rubber composition comprising the following compound:

R1—NH-phenyl-NH—R2 where the amino moieties occupy the 1 and 4 positions of the phenyl ring, and R1 and R2 are selected from the group consisting of H, C1 to C3 straight chain or branched alkyl groups, and wherein R1 and R2 may be the same or different; and where the $t_{90}$, isothermal at 125° C. is within thirty percent of the $t_{90}$, after 28 days aging at forty degrees Celsius (40° C.), as the unaged green rubber composition. In another embodiment, R1 and R2 are selected from C4 to C5 straight chain or branched alkyl groups. In another embodiment of the invention, R1 and R2 are selected from C6 to C15 straight chain or branched alkyl groups. In another embodiment of the invention, the rubber compound is greater than 5 parts by weight per hundred parts of the rubber composition.

18 Claims, 3 Drawing Sheets

RUBBER COMPOSITION AND TIRE COMPRISING SAME

This application is a continuation and claims the benefit of International Application No. PCT/US2004/020961, filed 29 Jun. 2004.

BACKGROUND OF THE INVENTION

1. Field of the Invention

The present invention is in the field of elastomeric compositions, more particularly in the field of fast-curing rubber compositions for use in rubber articles, such as tires, belts, hoses, and tracks.

2. Description of the Related Art

The market for retreaded pneumatic tires is almost entirely in the arena of trucking, aircraft, and earthmoving vehicles. In the trucking market, the carcass of a tire is expected to last several hundred thousand miles, and be amenable to having a new tread adhered to it several times. New truck tires are quite expensive, and are therefore bought with the expectation that their high initial costs are offset by the long service life of the carcass, and the low comparative cost of retreading.

A variety of procedures and different types of equipment are available for use in recapping or retreading pneumatic tires. One of the first steps in retreading a worn tire is to remove remaining tread material from the tire carcass, for example, by a sanding procedure known as buffing. Next a layer of green (uncured) rubber, known as "cushion gum," is applied to the carcass. This layer of extruded uncured rubber may be stitched or adhesively bonded to the carcass. Next, a tread layer is applied atop the layer of cushion gum. In the cold recapping process, the tread is cured rubber, and has a tread pattern already impressed in its outer surface. The tire is then placed in an autoclave, and heated under pressure for an appropriate time to induce curing of the gum layer, and bonding of the gum layer to the tread and the carcass. In the hot recapping process, the tread is uncured rubber, and has no tread pattern. The tire is then placed in a tire mold and heated under pressure for an appropriate time to cure the gum layer and the tread, and to cause the gum layer to bind with the tread and the carcass. [The term "cure" refers to the formation of cross-links between the elastomer molecules in the rubber compound, otherwise known as vulcanization].

However, in recapping procedures it is often necessary to employ rubber compounds with short vulcanization times. Low curing temperatures necessitate the use of ultra-accelerators in the rubber compound, which creates challenges for the employment of the compound. The accelerators at ambient temperature may begin to react with other components of the compound. They must therefore be stored under refrigeration to prevent premature curing of the compound or evolution of the cure rate. More importantly, the cure rate may increase upon green aging of the compound, leading to the need for a process modification or possibly hindering performance of the product.

Various methods have been proposed to prevent premature curing of the cushion rubber compound. These include Japanese Patent No. 48052678 (1973); Japanese Patent No. 48052679 (1973); German Patent Application No. DE19754341 (1999); International Patent No. WO99/27012 (1999); European Patent Application No. EP1034216 (2000); Japanese Patent No. 59022942 (1984); Japanese Patent No. 52069455 (1977). None of these methods has proven entirely satisfactory.

Therefore, it would be beneficial to have a rubber composition which did not require refrigeration, and which limited its cure rate change through its useful life, or, better still, which showed no cure rate change through its useful life.

SUMMARY OF THE INVENTION

The present invention is a rubber composition comprising the following compound:

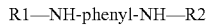

where the amino moieties occupy the 1 and 4 positions of the phenyl ring, and R1 and R2 are selected from the group consisting of:

H, C1 to C3 straight chain or branched alkyl groups, and wherein R1 and R2 may be the same or different;

and where the $t_{90}$, isothermal at 125° C. is within thirty percent of the $t_{90}$, after 28 days aging at forty degrees Celsius (40° C.), as the unaged green rubber composition.

In another embodiment of the invention, R1 and R2 are selected from C4 to C5 straight chain or branched alkyl groups. In another embodiment of the invention, R1 and R2 are selected from C6 to C15 straight chain or branched alkyl groups. In another embodiment of the invention, the rubber compound is greater than 5 parts by weight per hundred parts of the rubber composition.

In a further embodiment of the invention, the rubber composition set forth above has a scorch, measured at 105° C., within eight percent of the scorch, after 28 days aging at forty degrees Celsius (40° C.), as the unaged green rubber composition.

In a further embodiment of the invention, the rubber composition includes a dithiocarbamate accelerator. In a further embodiment of the invention, the rubber composition comprises natural or synthetic rubbers.

The present invention also includes a tire comprising the composition. The present invention also includes a method or retreading a tire by use of the composition as a connecting rubber, and repairing a defect in a tire by use of the composition.

DETAILED DESCRIPTION OF PREFERRED EMBODIMENTS

Figure 1:
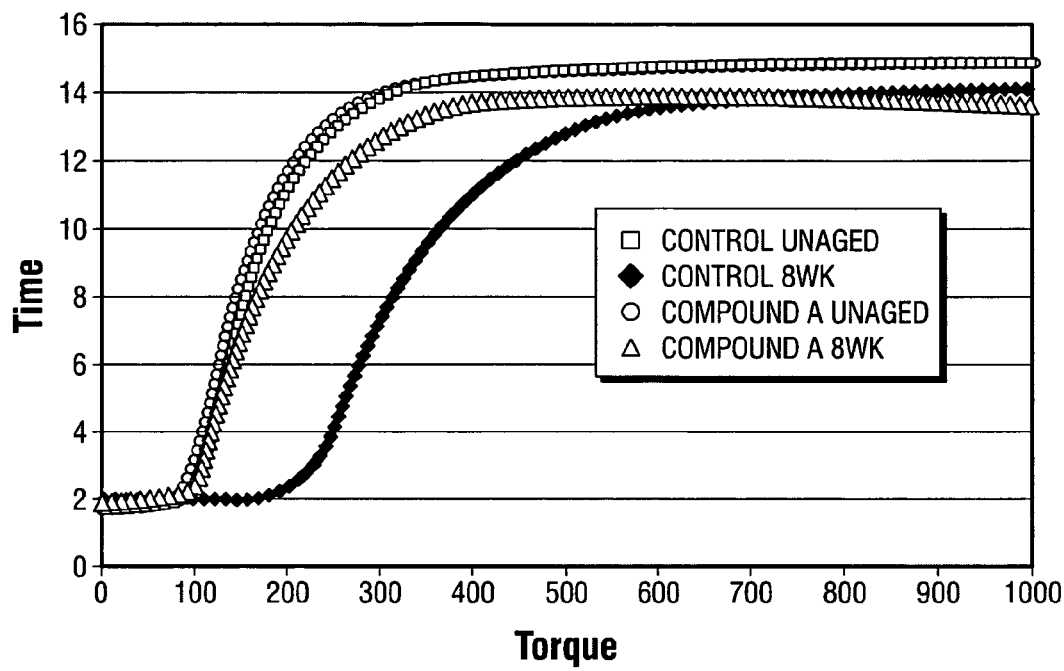
FIG. 1 is a rheometer curve showing an unaged connecting rubber versus a connecting rubber aged for 8 weeks at 40 degrees Celsius.

The present invention is a rubber composition comprising the following compound:

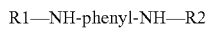

where the amino moieties occupy the 1 and 4 positions of the phenyl ring, and R1 and R2 are selected from the group consisting of:

H, C1 to C3 straight chain or branched alkyl groups, and wherein R1 and R2 may be the same or different; and where the $t_{90}$, isothermal at 125° C. is within thirty percent of the $t_{90}$, after 28 days aging at forty degrees Celsius (40° C.), as the unaged green rubber composition.

In another embodiment of the invention, R1 and R2 are selected from C4 to C5 straight chain or branched alkyl groups. In another embodiment of the invention, R1 and R2 are selected from C6 to C15 straight chain or branched alkyl groups. In another embodiment of the invention, the rubber compound is greater than 5 parts by weight per hundred parts of the rubber composition.

In a further embodiment of the invention, the rubber composition set forth above has a scorch, measured at 105° C., within eight percent of the scorch, after 28 days aging at forty degrees Celsius (40° C.), as the unaged green rubber composition.

In a further embodiment of the invention, the rubber composition includes a blend of dithiocarbamate, guanidine, thiazole, thiuram, and sulfenamide accelerators. In a further embodiment of the invention, the rubber composition comprises natural or synthetic rubbers.

The present invention also includes a tire comprising the composition. The present invention also includes a method or retreading a tire by use of the composition as a connecting rubber, and repairing a defect in a tire by use of the composition.

The present invention permits storage of the rubber composition, particularly useful for retreading of tires, at ambient temperatures, obviating the need for refrigeration. Furthermore, said rubber mix can maintain the same cure rate through storage at ambient temperature, simplifying retreading operations.

The composition in accordance with the invention may further include the customary fillers and additives such as, for instance, carbon black, silica, silicic acid, zinc oxide, stearic acid, cobalt salts, resins, protective agents such as antioxidants, extender oils, tackifying agents, and various processing agents.

$t_{90}$ and Scorch

ASTM D2084 and ISO 3417 describe how to measure cure times (time t0 for the onset of cure, and time t90 for 90% completion of cure) for rubber compounds using an oscillating rheometer. These standards are incorporated by reference.

In another embodiment of the invention, the $t_{90}$ would be within twenty percent of the unaged green rubber composition.

Note that "within 5%" for instance, means that the difference between the new value and the original value is less than five percent of the original value.

Scorch

Scorch is the time at a given temperature required for the onset of crosslink formation, as indicated by an abrupt increase in viscosity. The Mooney viscosity test described in ASTM Standard D 1646, incorporated herein by reference, is used to measure scorch.

The Aging Test

The curing curve is measured before aging according to specific conditions. The aging test is performed by placing an uncured sample of the rubber in a laboratory oven typically 40 degrees Celsius. The uncured compound is aged in these conditions for several days, zero to four weeks, then the curing curve is measured at the same condition as with the unaged sample, to determine the "green stability" of the compound.

1. The uncured mix was milled to a thickness comparable to the actual production thickness. The samples described herein were milled to a thickness of 5-9 mm on a laboratory mill.
2. Samples milled to the specified thickness were placed in a laboratory oven (held at a temperature of 40 degrees Celsius) for a period 0-4 weeks.
3. Samples were removed from the oven at weekly intervals for rheometer testing. The evolution the cure system was measured by comparing the $t_{90}$ (unaged) to the $t_{90}$ (unaged) to $t_{90}$ data obtained at 28 day intervals.

Rubber

"Diene" elastomer or rubber is understood to mean, in known manner, an elastomer resulting at least in part (i.e., a homopolymer or a copolymer) from diene monomers (monomers bearing two double carbon-carbon bonds, whether conjugated or not).

In general, "essentially unsaturated" diene elastomer is understood here to mean a diene elastomer resulting at least in part from conjugated diene monomers, having a content of members or units of diene origin (conjugated dienes) which is greater than 15% (mol %).

Thus, for example, diene elastomers such as butyl rubbers or copolymers of dienes and of alpha-olefins of the EPDM type do not fall within the preceding definition, and may in particular be described as "essentially saturated" diene elastomers (low or very low content of units of diene origin which is always less than 15%).

Within the category of "essentially unsaturated" diene elastomers, "highly unsaturated" diene elastomer is understood to mean in particular a diene elastomer having a content of units of diene origin (conjugated dienes) which is greater than 50%.

These definitions being given, the following are understood more particularly to be meant by diene elastomer capable of being used in the compositions according to the invention:

(a)—any homopolymer obtained by polymerization of a conjugated diene monomer having 4 to 12 carbon atoms;
(b)—any copolymer obtained by copolymerization of one or more dienes conjugated together or with one or more vinyl aromatic compounds having 8 to 20 carbon atoms;
(c)—a ternary copolymer obtained by copolymerization of ethylene, of an α-olefin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as in particular 1,4-hexadiene, ethylidene norbornene or dicyclopentadiene;
(d)—a copolymer of isobutene and isoprene (butyl rubber), and also the halogenated, in particular chlorinated or brominated, versions of this type of copolymer.

Suitable conjugated dienes include 1,3-butadiene, 2-methyl-1,3-butadiene, 2,3-di($C_1$-$C_5$ alkyl)-1,3-butadienes such as, for instance, 2,3-dimethyl-1,3-butadiene, 2,3 diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl aromatic compounds are, for example, styrene, ortho-, meta- and para-methylstyrene, the commercial mixture "vinyltoluene", para-tert.-butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl aromatic units. The elastomers may have any microstructure, which is a function of the polymerization conditions used, in particular of the presence or absence of a modifying and/or randomizing agent and the quantities of modifying and/or randomizing agent used. The elastomers may for example be block, statistical, sequential or microsequential elastomers, and may be prepared in dispersion or in solution; they may be coupled and/or starred or alternatively functionalised with a coupling and/or starring or functionalising agent.

Polybutadienes are suitable, for example those having a content of 1,2-units of between 4% and 80%, or those having a cis-1,4 content of more than 80%, polyisoprenes, butadiene-styrene copolymers, and those having a styrene content of between 5% and 50% by weight, butadiene-isoprene copolymers, including those having an isoprene content of between 5% and 90% by weight, isoprene-styrene copolymers and those having a styrene content of between 5% and 50% by weight.

In summary the diene elastomer of the composition according to the invention may be selected from the group of highly unsaturated diene elastomers which consists of polybutadienes (BR), polyisoprenes (IR), natural rubber (NR), butadiene copolymers, isoprene copolymers and mixtures of these elastomers.

Such copolymers may also be selected from the group which consists of butadiene-styrene copolymers (SBR), butadiene-isoprene copolymers (BIR), isoprene-styrene copolymers (SIR) and isoprene-butadiene-styrene copolymers (SBIR).

The compositions of the invention may contain a single diene elastomer or a mixture of several diene elastomers, the diene elastomer or elastomers possibly being used in association with any type of synthetic elastomer other than a diene elastomer, or even with polymers other than elastomers, for example thermoplastic polymers.

Ultra-Accelerators

Rubber compositions which are intended for use as cushion gum, and those used as repair mixes, must present rapid curing at low temperatures with high yields. Therefore, in addition to vulcanization accelerators, ultra-accelerators are added to the composition. One classification of accelerators is as follows:

TABLE 1

| Type | Relative Vulcanization Time at 284° F. | Examples |
| --- | --- | --- |
| Slow | 90-120 minutes | Aniline |
| Moderately fast | Circa 60 min | Diphenylguanidine Hexamethylene tetramine |
| Fast | Circa 30 min | Mercaptobenzothiazole Benzothiazyl disulfide |
| Ultra-accelerators | Several minutes | Thiurams Dithiocarbamates Xanthates |

H. L. Stephans in "The Compounding and Vulcanization of Rubber", Chapter 2, Rubber Technology 3$^{rd}$ edition, edited by Maurice Morton, 1987, incorporated herein by reference.

Suitable vulcanization ultra-accelerators include thiurams, xanthates, dithiocarbamates, dithiophosphates, and mixtures thereof. More specifically, these include, but are not limited to:

dithiocarbamates—zinc dibenzyl dithiocarbamate (ZBEC—CAS No. 14726-36-4), zinc-N-dimethyl-dithiocarbamate (ZDMC), zinc-N-diethyldithiocarbamate (ZDEC—CAS No. 14323-55-1), zinc-N-dibutyl-dithiocarbamate (ZDBC—CAS No. 35884-05-0), zinc-N-ethylphenyl -dithiocarbamate (ZEBC—(CAS No. 14364-93-6), zinc-N-pentamethylene dithiocarbamate (ZPMC—CAS No. 13878-54-1), piperidinium pentamethylene dithiocarbamate (CAS No. 98-77-1), sodium diethyl dithiocarbamate (CAS No. 148-18-5); bismuth dimethyl dithiocarbamate (CAS No. 21260-46-8); cadmium diethyl dithiocarbamate (CAS No. 14239-68-0); copper dibutyl dithiocarbamate (CAS No. 13927-71-4); copper dimethyl dithiocarbamate (CAS No.137-29-1); cyclohexylethylammonium cyclohexyl ethyl dithiocarbamate; dimethylammonium dimethyl dithiocarbamate (CAS No.598-64-1); dimethylcyclohexylammonium dibutyl dithiocarbamate (CAS No. 149-82-6); lead diamyl dithiocarbamate (36501-84-5); lead dimethyl dithiocarbamate (CAS No. 19010-66-3); CAS No. 72146-43-1; CAS 72146-41-9; CAS No. 72146-42-0; nickel di-isobutyl dithiocarbamate (CAS No. 15317-78-9); nickel dibutyl dithiocarbamate (CAS No. 13927-77-0); nickel dimethyl dithiocarbamate (CAS No. 15521-65-0); N-oxydiethylenethiocarbamyl-N'oxydiethylenesulfenamide (CAS No. 13752-51-7); potassium di-methyl dithiocarbamate (CAS No. 128-03-0); selenium diethyl dithiocarbamate (CAS No. 5456-28-0); selenium dimethyl dithiocarbamate (CAS No. 144-34-3); sodium cylclohexylethyl dithiocarbamate; sodium dibenzyl dithiocarbamate (CAS No. 55310-46-8); sodium dibutyl dithiocarbamate (CAS No. 136-30-1); sodium dimethyl dithiocarbamate (CAS No. 128-04-1); disodium ethylene-bis-dithiocarbamate; sodium diisobutyl dithiocarbamate (CAS No. 2219-18-3); tellurium diethyldithiocarbamate (CAS No. 20941-65-5); zinc diamyl dithiocarbamate (CAS No. 15337-18-5); zinc dibutyl dithiocarbamate (CAS No.136-23-2); zinc diisobutyl dithiocarbamate (CAS No. 36190-62-2); zinc dimethyl dithiocarbamate (CAS No. 137-30-4); N, N dimethyl cyclohexyl ammonium dithiocarbamate; 2,2'-dithiodo (ethylammonium) bis (dibenzyl dithiocarbamate)

thiurams—tetramethylthiuram monosulphide (TMTM), tetramethylthiuram disulphide, tetraethylthiuram disulfide (TETD), tetrabenzylthiuram disulfide (TBzTD)

xanthates—zinc isopropyl xanthate (ZIX), sodium isopropyl xanthate (SIX), zinc butyl xanthate (ZBX), dibutyl xanthogen disulfide, diethyl xanthogenate, diisopropyl xanthogen disulfide, diisobutyl xanthogen disulfide, dithiophosphates—copper diisopropyl dithiophosphate, zinc-O-,O-di-n-butylphosphorodithioate Other suitable accelerators may be used in the rubber composition, such as: thiazoles, sulphenamides, guanidines, thiourea derivatives, amine derivatives, and combinations thereof. These include, but are not limited to: benzothiazyl-2-cyclohexyl sulphenamide (CBS), benzothiazoyl-2-tert.-butyl sulphenamide (TBBS), 2-mercaptobenzothiazole (MBT), zinc or sodium salt of 2-mercaptobenzothiazole (ZMBT), benzothiazyl-2-sulphene morpholide (MBS), benzothiazyl-dicyclohexy-1 sulphenamide (DCBS), diphenyl guanidine (DPG), Triphenyl guanidine (TPG), diorthotolyl guanidine (DOTG), o-tolylbigaunide (OTBG), ethylene thiourea (ETU), diethylthiourea (DETU), diphenyl thiourea (DPTU), benzothiazole disulfide (MBTS), hexamethylene tetramine (HMT), ethylidene aniline (EA), and mixtures thereof.

A combination of primary, secondary, and tertiary accelerators may be used to obtain the desired cure rate.

Sulfur

Suitable sulfur includes pulverized sulphur, rubber maker's sulphur, commercial sulphur, and insoluble sulfur.

Fillers

Useful fillers include carbon black, and so-called white, or inorganic fillers. The white or inorganic filler used as reinforcing filler may constitute all or only part of the total reinforcing filler, in this latter case associated, for example, with carbon black.

In the present application, "reinforcing inorganic filler", in known manner, is understood to mean an inorganic or mineral filler, whatever its colour and its origin (natural or synthetic), also referred to as "white" filler or sometimes "clear" filler in contrast to carbon black, this inorganic filler being capable, on its own, without any other means than an intermediate coupling agent, of reinforcing a rubber composition intended for the manufacture of tires, in other words which is capable of replacing a conventional tyre-grade carbon black filler in its reinforcement function.

The reinforcing inorganic filler may be a mineral filler of the siliceous or aluminous type, or a mixture of these two types of fillers.

The physical state in which the reinforcing inorganic filler is present is immaterial, whether it be in the form of a powder, microbeads, granules or alternatively balls. Of course, "reinforcing inorganic filler" is also understood to mean mixtures of different reinforcing inorganic fillers, in particular of highly dispersible siliceous and/or aluminous fillers such as described above.

The reinforcing inorganic filler may also be used in a blend (mixture) with carbon black. Suitable carbon blacks are any carbon blacks, including the blacks of the type HAF, ISAF and SAF, which are conventionally used in tires, and particularly in treads for these tires. As non-limitative examples of such blacks, mention may be made of the blacks N115, N134, N234, N339, N347, N375, and the 600 series, including, but not limited to, N630, N650 and N660. The amount of carbon black present in the total reinforcing filler may vary within wide limits, this amount in one embodiment being less than the amount of reinforcing inorganic filler present in the rubber composition.

Preparation of the Rubber Compositions

The compositions are produced in suitable mixers, in a manner known to the person skilled in the art, typically using two successive preparation phases, a first phase of thermomechanical working at high temperature, followed by a second phase of mechanical working at lower temperature, as described, for example, in the applications EP-A-0 501 227, EP-A-0 810 258 or WO99/28376.

The first phase of thermomechanical working (sometimes referred to as "non-productive" phase) is intended to mix thoroughly, by kneading, the various ingredients of the composition, with the exception of the vulcanization system. It is carried out in a suitable kneading device, such as an internal mixer or an extruder, until, under the action of the mechanical working and the high shearing imposed on the mixture, a maximum temperature generally between 120° C. and 190° C., more narrowly between 130° C. and 180° C., is reached.

This first phase may itself comprise a single or several thermomechanical working stages, separated for example by one or more intermediate cooling stages. The various ingredients of the composition, elastomer(s), reinforcing filler and its coupling agent, and the various other components ("additives") may be incorporated in the mixer in one or more steps, either during the first thermomechanical stage, or staggered during the various thermomechanical stages, if applicable. The total duration of this thermomechanical working (typically between 1 and 20 minutes, for example between 2 and 10 minutes) is selected according to the specific operating conditions, in particular the maximum temperature selected, the nature and volume of the constituents, the important thing being that a good dispersion of the various ingredients which inter-react is obtained in the elastomeric matrix, thus permitting firstly good processing of the composition in the uncured state, then a sufficient level of reinforcement, after curing, by the reinforcing filler and its intermediate coupling agent.

After cooling of the mixture thus obtained, a second phase of mechanical working is then implemented, at a lower temperature. Sometimes referred to as "productive" phase, this finishing phase consists of incorporating by mixing the vulcanization (or cross-linking) system (sulphur and accelerator(s)), in a suitable device, for example an open mill. It is performed for an appropriate time (typically between 1 and 30 minutes, for example between 2 and 5 minutes) and at a sufficiently low temperature (typically less than 120° C., for example between 60° C. and 100° C.), in all cases lower than the vulcanization temperature of the mixture, so as to protect against premature vulcanization (scorching). The second stage of mixing may be done on either a mill or a Banbury mixer. The rubber compound according to the invention can be incorporated in the rubber composition in either the first or the second stage of mixing.

After the mixing steps, described briefly above, the final composition thus obtained can then calendered, for example in the form of a film or a sheet, in particular for characterization in the laboratory, or alternatively extruded, in order to form for example a rubber profiled element or a repair material.

It goes without saying that the invention relates to the rubber compositions previously described, both in the "uncured" state (i.e., before curing) and in the "cured" or vulcanized state (i.e., after cross-linking or vulcanization).

Of course, the compositions according to the invention may be used alone or in a blend with other rubber compositions which can be used for manufacturing tires.

Rubber Composition

In one embodiment of the invention, a typical rubber composition is made as follows: 0-100 phr dienic elastomer or mixture of dienic elastomers, 0-60 phr filler, 0-35 phr aromatic oils (including naphthenic and paraffinic oils), 0-4 phr antidegradant/antiozonant, 0.5 to 3 parts stearic acid, 0-3 phr primary, secondary or tertiary accelerator, or a mixture, 0.2-3 phr ultra accelerator, 0-4 phr sulfur, 0-5 phr zinc oxide, 0-5 phr tackifying resin and 5-10 phr of the phenylene diamine compound according to the invention.

Explanation of Figures

FIG. 1 illustrates the rheometer curing curve (using an MDR type rheometer) for the unaged and for the aged control mix. The abscissa is time and the ordinate is torque.

Figure 2:
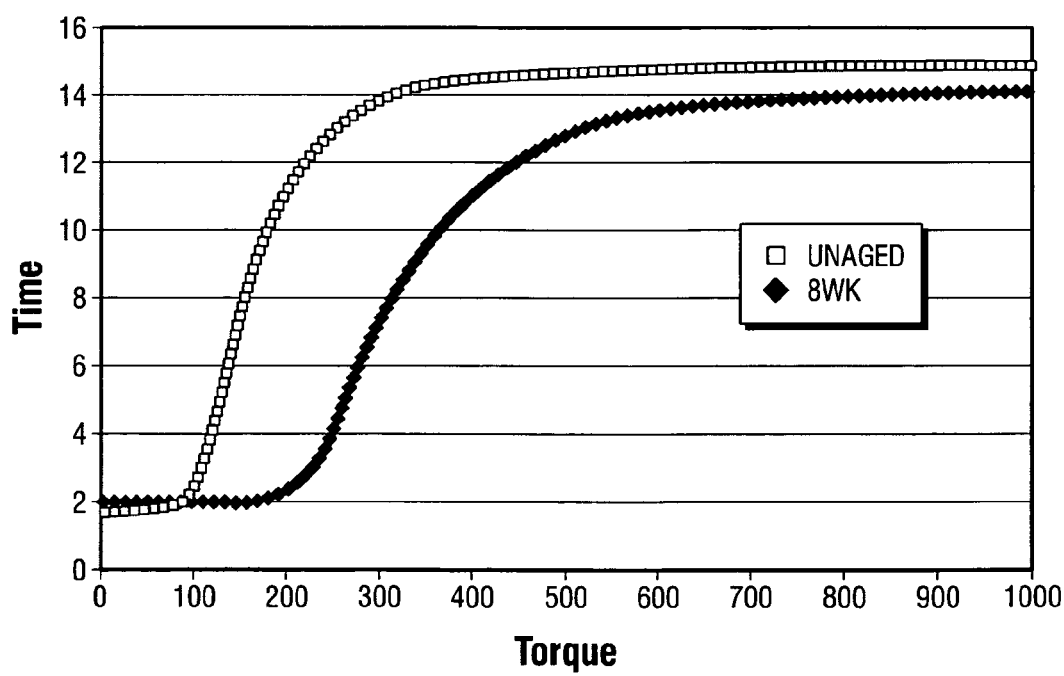
FIG. 2 is a rheometer curve showing unaged and aged rubber compositions, one according to the invention, and one not according to the invention.

FIG. 2 illustrates the rheometer curing curve for the control mix and a mix according to the invention containing compound A. Curves for the unaged and aged compounds are also shown.

The invention will be further understood by reference to the following non-limiting examples.

EXAMPLES

Below are several examples which show the effect on scorch after an accelerated aging test at 40° C. The examples represent different compositions which are the subject of this invention.

A control rubber mix was prepared as follows:

(a) 100 parts by weight per hundred parts (phr) rubber;
(b) 40-60 phr carbon black;
(c) 0-30 phr oil;
(d) 2-5 parts zinc oxide;
(e) 1-3 part stearic acid;

(f) 1-3 parts anti-oxidant
(g) 1-3 phr sulfur
(h) 1-5 phr blend of accelerators and ultra-accelerators.

Example 1

The time to cure of a cushion gum mix including an ultra-accelerator decreases with time. Due to this decrease in curing efficiency, the curing time must be increased to compensate. This change in curing efficiency can be seen in the increase in scorch and t90 (obtained from a rheometer test—time required to reach 90% of the maximum torque).

The composition according to the present invention has a reduced scorch and t90 as compared to a standard cushion gum formulation not according to the invention. This stabilization of the cure system is shown in the supporting data below. Compound A is N,N' Bis(1,4-dimethylpentyl)-p-phenylenediamine); compound B is N,N'-di-sec-butyl-p-phenylenediamine.

The data shown in Table 2 show that the scorch of the initial compound increases from 13 to 28 minutes over the four week aging period (at a temperature of 40° C.). The same evolution can be seen with other anti-degradants such as Durazone 37 (2,4,6-tris(N-1,4-dimethylpentyl-p-phenylene diamine)-1,3,5-triazine; CAS No. 121246-28-4 Crompton), TMQ (2,2,4-trimethyl-1,2-dihydroquinolone-Crompton) and Vulkazone (Bayer). However, the scorch increases significantly less when compound A is included in the formulation (11 to 14 minutes).

Example 3

Table 4 shows that impact of 2 and 4 phr loadings of Compound A in liquid form. Increased loadings reduce the evolution of the scorch.

TABLE 4

| | Scorch (105° C.) Results | | |
|---|---|---|---|
| | Witness | Compound A (2 phr) | Compound A (4 phr) |
| Mix # | 2 | 3 | 4 |
| Unaged | 11.4 min | 10.9 min | 8.1 min |
| Aged (4 weeks @ 40° C.) | 23.4 min | 12.5 min | 7.9 min |

Example 4

Figure 3:
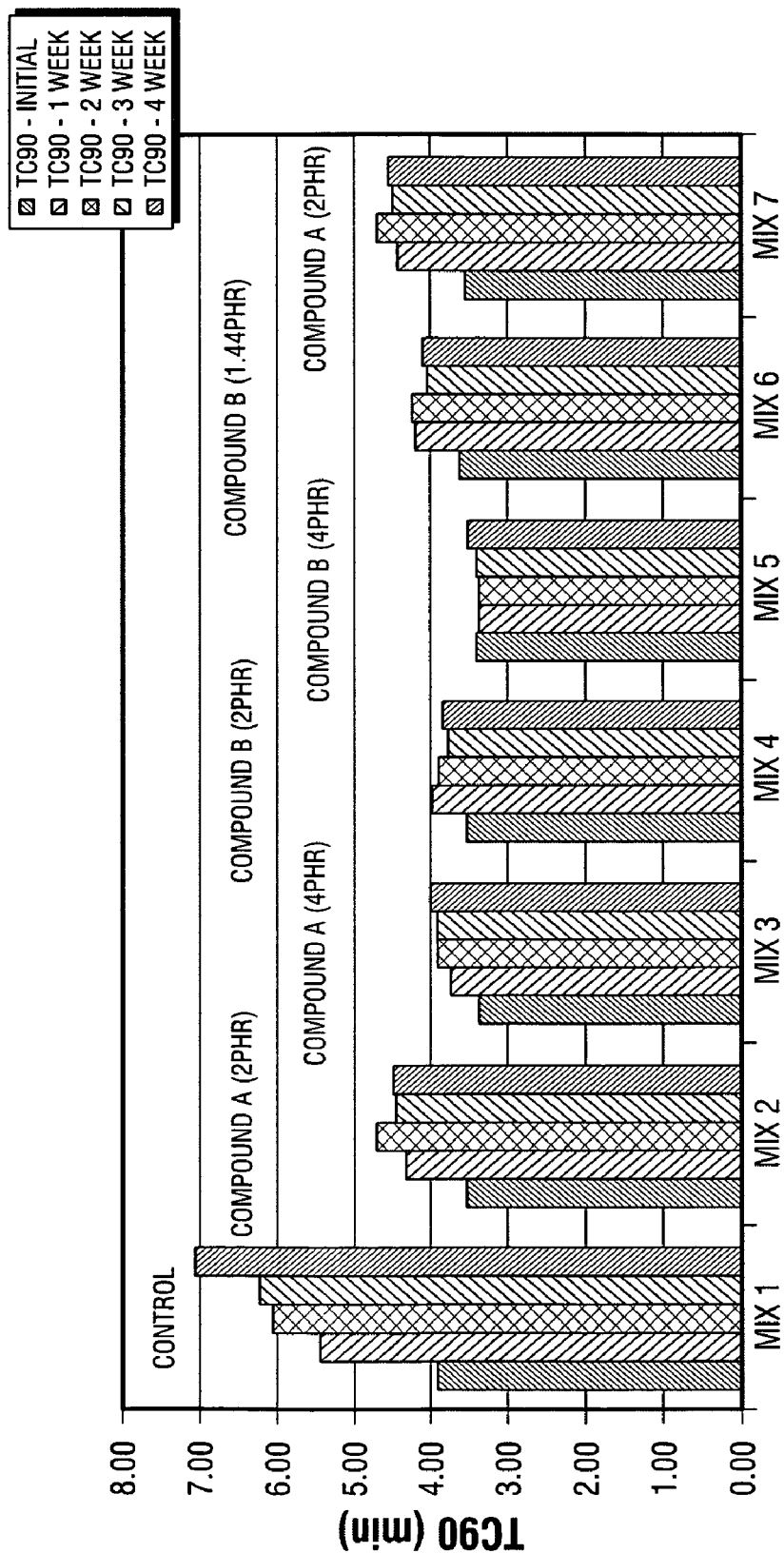
FIG. 3 is a graph showing the impact of R1—NH-Phenyl-NH—R2 compositions according to the invention on the green mix stability of an ultra-accelerated connecting rubber.

FIG. 3—Impact of Compound A and Compound B on Green Mix Stability

FIG. 3 is a graph showing the impact of R1—NH-Phenyl-NH—R2 compositions according to the invention on the green mix stability of an ultra-accelerated connecting rubber. Compound A is N,N' Bis(1,4-dimethylpentyl)-p-phenylenediamine); compound B is N,N'-di -sec-butyl-p-phenylenediamine The compounds were aged (as described above) for a period of four weeks at 40° C. Rheometer testing was con-

TABLE 2

| | Scorch results | | | | |
|---|---|---|---|---|---|
| | Control | Compound A (2 phr) | Durazon (0.5 phr) | TMQ (2 phr) | Vulkazone AFS/LG (2 phr) |
| Mix # | 1 | 3 | 6 | 2 | 4 |
| Unaged | 13 min | 11 min | 12 min | 12 min | 13 min |
| Aged (4 weeks @ 40° C.) | 28 min | 14 min | 25 min | 26 min | 26 min |

Example 2

Table 3 shows the results of a second experiment where the control mix and mixes formulated with DAPD (mixed diaryl p-phenylenediamine-Crompton) evolve from 15.4 minutes to 21.2. However, the mix formulated with compound A in liquid form evolved from 9.4 to 10.1 minutes over the same aging period. Mix #8 also shows that if calcium silicate supported compound A yields the same results as the compound A in liquid form.

ducted at weekly intervals. The T90 for each week has been included in this graph. The control mix evolves from 3.9 minutes to 7.2 minutes. The evolution of mixes containing compounds A and B occurs at a reduced rate.

Example 5

Figure 4:
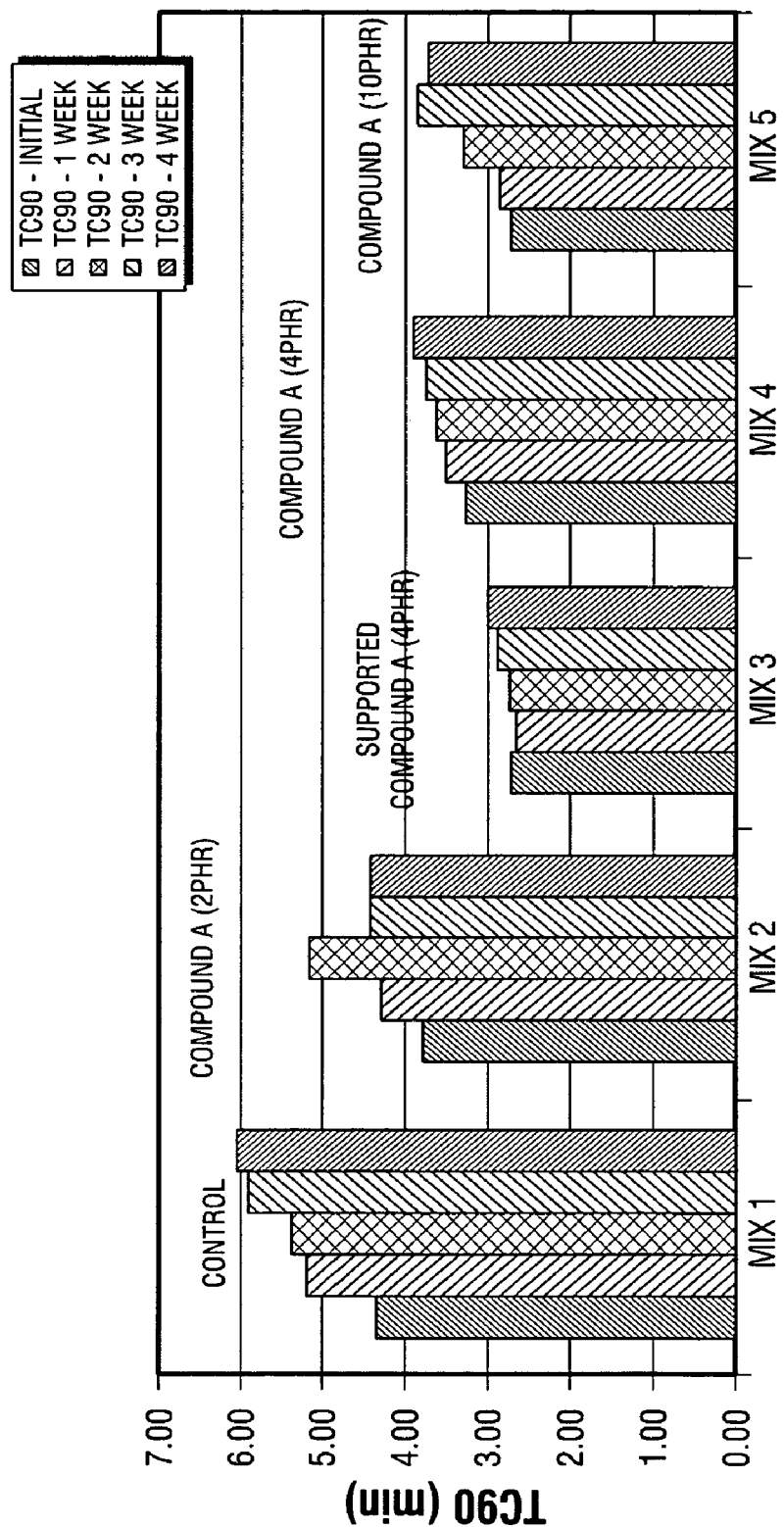
FIG. 4 is a graph that illustrates the effect a compound loading on stability.

FIG. 4—The impact of higher loadings of compound A on aging.

TABLE 3

| | Scorch (105° C.) Results | | | | |
|---|---|---|---|---|---|
| | Control | DAPD (1 phr) | DAPD (1.5 phr) | DAPD (2 phr) | Compound A (2 phr liquid) | Compound A (3.1 phr solid)* |
| Mix # | 2 | 4 | 5 | 9 | 7 | 8 |
| Unaged | 15.4 min | 16.1 min | 15.8 min | 15.2 min | 9.4 min | 7.2 min |
| Aged (4 weeks @ 40° C.) | 21.2 min | 23.5 min | 26.1 min | 25.8 min | 10.1 min | 9.0 min |

*65% active product on a solid carrier, Equivalent to 2 phr liquid.

FIG. 4 is a graph that illustrates the effect of compound A loading on stability. Based on these two graphs, loadings of 4 phr had the highest level of green mix stability. Four phr of liquid compound A appears to offer the best stability performance. Supported compound A (on a calcium silicate carrier) offered the best performance of the compounds tested.

Other modifications and variations of the present invention will be apparent to those skilled in the art upon reading the present specification and these are intended to be within the spirit of the invention and the scope of the claims.

What is claimed is:

1. A cushion gum having improved storage stability, the cushion gum comprising:
    rubber selected from the group consisting of polybutadienes (BR), polyisoprenes (IR), natural rubber (NR), butadiene copolymers, isoprene copolymers and mixtures of these elastomers, butadiene-styrene copolymers (SBR), butadiene-isoprene copolymers (BIR), isoprene-styrene copolymers (SIR) and isoprene-butadiene-styrene copolymers (SBIR) and mixtures thereof;
    an ultra-accelerator; and
    between 3 and 10 phr (parts per hundred of the rubber by weight) of a compound

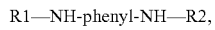

wherein the amino moieties occupy the 1 and 4 positions of the phenyl ring, and R1 and R2 are selected from the group consisting of H, C1 to C3 straight chain or branched alkyl groups, C4 to C5 straight chain or branched alkyl groups and C6 to C15 straight chain or branched alkyl groups; wherein if R1 and R2 are branched alkyl groups, the branched groups are methyl groups, ethyl groups or combinations thereof, and wherein R1 and R2 may be the same or different; and wherein the increased storage stability is evidenced by the $t_{90}$ isothermal at 125° C., after 28 days aging at 40° C., being within thirty percent of the $t_{90}$ isothermal of the unaged composition.

2. The cushion gum of claim 1, wherein the increased storage stability is evidenced by the $t_{90}$ isothermal at 125° C., after 28 days aging at 40° C., being within twenty percent of the $t_{90}$ isothermal of the unaged composition.

3. The cushion gum of claim 1, wherein the compound is used between 4 phr and 10 phr.

4. The cushion gum of claim 1, wherein the compound is used between about 5 phr and 10 phr.

5. The cushion gum of claim 1, wherein the compound is selected from the group consisting of: N,N'-bis (1,4dimethylpentyl)-p-phenylene diamine; N, N'-di-sec-butyl-p-phenylendiamine; and mixtures thereof.

6. The cushion gum of claim 1, wherein the compound is N,N'-bis (1,4dimethylpentyl)-p-phenylene diamine.

7. The cushion gum of claim 1, wherein the increased storage stability is further evidenced by the scorch, measured at 105° C., after 28 days aging at 40° C., being within eight percent of the scorch of the unaged composition.

8. The cushion gum of claim 1, wherein the increased storage stability is further evidenced by the scorch, measured at 105° C., after 28 days aging at 40° C., being within five percent of the scorch of the unaged composition.

9. The cushion gum of claim 1, wherein the increased storage stability is further evidenced by the scorch, measured at 105° C., after 28 days aging at 40° C., being within three percent of the scorch of the unaged composition.

10. The cushion gum of claim 1, wherein the ultra-accelerator is a dithiocarbamate accelerator.

11. The cushion gum of claim 1, wherein the rubber is natural rubber.

12. A method of improving the storage stability of a rubber cushion gum, the method comprising the steps of:
    mixing components of the cushion gum, the components comprising rubber selected from the group consisting of polybutadienes (BR), polyisoprenes (IR), natural rubber (NR), butadiene copolymers, isoprene copolymers and mixtures of these elastomers, butadiene-styrene copolymers (SBR), butadiene-isoprene copolymers (BIR), isoprene-styrene copolymers (SIR) and isoprene-butadiene-styrene copolymers (SBIR) and mixtures thereof; and a dithiocarbamate ultra-accelerator;
    adding an additional component into the cushion gum, the additional component being between 5 and 10 phr (parts per hundred of rubber by weight), of a compound selected from N,N'-bis(1,4dimethylpentyl)-p-phenylenediamine: N,N'-di-sec-butyl-p-phenylendiamine or mixtures thereof.

13. The method of claim 12, wherein the improved storage stability is evidenced by the $t_{90}$ isothermal at 125° C., after 28 days aging at 40° C., being within thirty percent of the $t_{90}$ isothermal of the unaged composition.

14. A method of retreading a tire, the method comprising the steps of:
    removing a tread from a carcass of the tire;
    applying a cushion gum comprising rubber selected from the group consisting of polybutadienes (BR), polyisorenes (IR), natural rubber (NR), butadiene copolymers, isoprene copolymers and mixtures of these elastomers, butadiene-styrene copolymers (SBR), butadiene-isoprene copolymers (BIR), isoprene-styrene copolymers (SIR) and isoprene-butadiene-styrene copolymers (SBIR) and mixtures thereof; an ultra-accelerator; and between 3 and 10 phr (parts per hundred of the rubber by weight) of a compound

wherein the amino moieties occupy the 1 and 4 positions of the phenyl ring, and R1 and R2 are selected from the group consiting of H, C1 to C3 straight chain or branched alkyl groups, C4 to C5 straight chain or branched alkyl groups and C6 to C15 straight chain or branched alkyl groups; wherein if R1 and R2 are branched alkyl groups, the branched groups are methyl groups, ethyl groups or combinations thereof, and wherein R1 and R2 may be the same or different;
    contacting the tread with the carcass; and
    heating the combination of the tread, carcass and gum cushion composition until the tread is adhered to the carcass.

15. The method of claim 14, wherein the compound is used between 4 phr and 10 phr.

16. The method of claim 14, wherein the compound is used between about 5 phr and 10 phr.

17. The method of claim 14, wherein the compound is selected from the group consisting of: N,N'-bis (1,4dimethylpentyl)-p-phenylene diamine; N,N'-di-sec-butyl-p -phenylenediamine and mixtures thereof.

18. The method of claim 14, wherein the ultra-accelerator is a dithiocarbamate accelerator.

\* \* \* \* \*